United States Patent [19]

Choi

[11] Patent Number: 5,963,219
[45] Date of Patent: Oct. 5, 1999

[54] METHOD FOR STORING AND RESTORING DATA OF A GRAPHIC DEVICE

[75] Inventor: Seung-Beom Choi, Suwon, Rep. of Korea

[73] Assignee: SamSung Electronics Co., Ltd., Suwon, Rep. of Korea

[21] Appl. No.: 08/901,346

[22] Filed: Aug. 21, 1997

[30] Foreign Application Priority Data

Aug. 21, 1996 [KR] Rep. of Korea ...................... 96/34703

[51] Int. Cl.$^6$ .................................................. G06F 15/00
[52] U.S. Cl. ...................................... 345/501; 395/750.05
[58] Field of Search ....................... 345/501; 395/750.03, 395/750.05

[56] References Cited

U.S. PATENT DOCUMENTS

| | | | |
|---|---|---|---|
| 4,709,379 | 11/1987 | Hashimoto et al. | 395/182.13 |
| 5,021,983 | 6/1991 | Nguyen et al. | 364/707 |
| 5,355,490 | 10/1994 | Kou | 395/653 |
| 5,404,546 | 4/1995 | Stewart | 395/750.04 |
| 5,410,711 | 4/1995 | Stewart | 395/750.04 |
| 5,524,249 | 6/1996 | Suboh | 395/750.04 |
| 5,548,765 | 8/1996 | Tsunoda et al. | 395/750.04 |
| 5,590,340 | 12/1996 | Morita et al. | 395/750.05 |
| 5,615,376 | 3/1997 | Ranganathan | 395/750.04 |
| 5,619,707 | 4/1997 | Suboh | 395/750.04 |
| 5,638,541 | 6/1997 | Sadashivaiah | 395/750.05 |
| 5,640,574 | 6/1997 | Kawashima | 395/750.05 |
| 5,696,978 | 12/1997 | Nishikawa | 395/750.06 |
| 5,748,178 | 5/1998 | Drewry | 345/138 |
| 5,758,174 | 5/1998 | Crump et al. | 395/186 |

*Primary Examiner*—Kee M. Tung
*Assistant Examiner*—Sy D. Luu
*Attorney, Agent, or Firm*—Robert E. Bushnell, Esq.

[57] ABSTRACT

A method of storing and restoring graphic data of a graphic device by using a VGA (video graphics array) VESA function in a computer system having a hibernation function, includes: a segment examining step of examining the VGA basic input/output system in order to know where the ROM BIOS is mapped in an option ROM area of a system memory map when changing into a hibernation state; a function calling step of calling the VESA function for storing the VGA internal register of the graphic device after executing the segment examining step; a register storing step of storing the chipset hardware operating state, including RAMDAC data and the VGA register information, after calling the VESA function; and a memory storing step of determining the VGA register so that access of a CPU is possible by examining a graphic memory contained within the graphic device and storing the graphic memory data in an auxiliary storage device after executing the register storing step. This allows the storing and restoring of graphic data by expanding the kind of graphic device to be supported without changing the contents of the BIOS when supporting the hibernation function of a different graphic chipset.

12 Claims, 2 Drawing Sheets

METHOD FOR STORING AND RESTORING DATA OF A GRAPHIC DEVICE

CLAIM OF PRIORITY

This application makes reference to, incorporates the same herein, and claims all benefits accruing under 35 U.S.C. §119 from an application for METHOD FOR STORING AND RESTORING DATA OF A GRAPHIC DEVICE earlier filed in the Korean Industrial Property Office on the 21$^{st}$ day of August 1996 and there duly assigned Ser. No. 34703/1996, a copy of which application is annexed hereto.

BACKGROUND OF THE INVENTION

1. Field of the Invention

The present invention relates to a method of storing and restoring data of a graphic device, and more particularly, to a method of storing and restoring graphic data by using a VGA(video graphics array) VESA(video electronics standards association) function in a computer system having a hibernation function. More particularly, the present invention relates to a method of storing and restoring graphic data by expanding the kind of graphic card to be supported without changing the contents of the BIOS(basic input/output system) when supporting the hibernation function of a different graphic chipset.

2. Description of the Related Art

Advance technological developments in computers have made power saving functions a necessity in order to manage the power to the various components in computers. A personal computer supports a suspend mode by using power saving elements and adding a power management system and a control logic. A computer also supports a hibernation mode for storing the present input/output state of the system to a predetermined space in a hard disk drive and supplying the power when the system does not receive any activity after a predetermined period of time.

The functions of power saving, scheduler, and quick start are embodied by using the advanced power management (APM) system in a personal computer. The APM system is set by a device driver provided from MS-DOS and saves the selected power.

The hibernation system has two functions as follows. First, an emergency automatic restoration function for storing the present operating state in an auxiliary memory, such as a hard disk, when power is cut off by a sudden interruption of electric power or in error by a user and restoring the operating state, according to the contents which are stored in the auxiliary memory, of the computer to the previous operating state when power is supplied again.

Second, a power saving function for automatically storing a present operating state in an auxiliary memory, such as a hard disk, and cutting off the power when a computer is not used for a predetermined period of time and resuming the power and returning to the previous operating state when the computer is used again.

Recently, the personal computer market is expanding under public demand for a hibernation system having the emergency automatic restoration function and the power saving function.

Conventionally, power is supplied to the system and the graphic device when a computer is in the wait mode or the suspend mode. The computer mode changes into the wait mode or the suspend mode by using an input/output register of the chipset without storing and restoring information of the graphic device since the chipset supports the wait mode or the suspend mode, and is returned to the normal state when an user inputs data into a keyboard or a mouse is moved to a particular input.

In addition, the present state and the present graphic data of the system are stored in the hard disk drive by using a hibernation function. The stored state and graphic data of the system are restored when returning to a previous state or changing into the hibernation mode for the work requested by an user and a application program.

The quick start(or, instant on) makes the system operate again by using a link pack area again so that the system may be returned to the previous operating state without booting when supplying the power to the personal computer. An initial program loader (IPL) operating the computer controlled under an operating system or a monitor system includes a cold start and a quick start. The cold start is the initial IPL after forming the system or the IPL loading the link pack area again. The quick start uses again a page and a segment table of the link pack area after supplying the power.

The wait mode is a temporary stop mode and reduces the power consumption by extending the operating time when no activity occurs to the system for a predetermined period of time. The suspend mode is a stop mode, is a temporary stop state when a sudden interruption of electric power or unplugging of the computer, and is the state changing into the hibernation.

Conventionally, the method of storing data of the graphic device when embodying the hibernation of the computer is executed as follows. First, the system BIOS examines the kind of graphic card of the system in order to store data of the graphic device when generating the hibernation admission signal in the ROM(read only memory) BIOS of the system. Because the VGA chipset register setting method of storing the graphic memory according to the kind of graphic chipset are different from each other, the kind of VGA chipset internal register are different from each other. Next, the VGA internal register is stored according to the kind of VGA chipset. The data of the graphic device is stored by storing the graphic memory after changing the graphic mode into a linear address mode of the 256 color mode.

The program size expands as the number of kinds of graphic cards supporting the hibernation increases, because the graphic data is stored respectively according to each graphic chipset in the system BIOS. The BIOS should be upgraded since the contents of the system BIOS is changed when supporting an additional graphic device.

The following patents each disclose features in common with the present invention but do not teach or suggest the specifically recited method of storing and restoring data of a graphic device of the present invention: U.S. Pat. No. 5,355,490 to Kou, entitled System And Method For Saving The State For Advanced Microprocessor Operating Modes, U.S. Pat. No. 4,709,349 to Hashimoto et al., entitled Method For Maintaining Display/Print Mode In Display Printer, U.S. Pat. No. 5,640,574 to Kawashima, entitled Portable Computer Apparatus Having A Display Capable Of Displaying Power Management Information And Method Of Controlling The Display, U.S. Pat. No. 5,638,541 to Sadashivaiah, entitled System And Method For Managing Power On Desktop Systems, U.S. Pat. No. 5,619,707 to Suboh, entitled Video Subsystem Power Management Apparatus And Method, U.S. Pat. No. 5,615,376 to Ranganathan, entitled Color Management For Power Reduction In A Video Display Sub-System, U.S. Pat. No. 5,590,340 to Moritaetal., entitled Apparatus And Method For Suspending And Resuming Software Application On A Computer, U.S. Pat. No. 5,548,765 to Tsunoda et al., entitled Power Saving Display Subsystem For Portable Computers, U.S. Pat. No. 5,524,249 to Suboh, entitled Video Subsystem Power Management Apparatus And Method, U.S. Pat. No. 5,410,711 to Stewart, entitled Potable Computer With BIOS-Independent Power Management, and U.S. Pat. No. 5,404,546 to Stewart, entitled BIOS Independent Power Management For Portable Computer.

SUMMARY OF THE INVENTION

It is an object of the present invention to provide a method of storing and restoring graphic data by expanding the kind of graphic card to be supported without changing the contents of the BIOS when supporting the hibernation function of a different graphic chipset.

To achieve the above object, the present invention includes:

a segment examining step of examining the VGA BIOS in order to know where the ROM BIOS is mapped among the option ROM area of the system memory map when changing into the hibernation state;

a function calling step of calling the VESA function for storing the VGA internal register of the graphic device after executing the segment examining step;

a register storing step of storing the chipset hardware operating state such as the RAMDAC(random access memory digital analog converter) data and the VGA register information after calling the VESA function; and a memory storing step of determining the VGA register so that the access of the CPU is possible by examining a graphic memory contained within the graphic device and storing the graphic memory data in an auxiliary storage device after executing the register storing step.

To achieve the above object, the present invention may also include:

a segment examining step of examining the VGA BIOS in order to know where the ROM BIOS is mapped among the option ROM area of the system memory map when changing from the hibernation state into the normal state;

a function calling step of calling the VESA function for storing the VGA internal register of the graphic device after executing the segment examining step;

a memory restoring step of restoring the memory data of the graphic device from the data stored in the auxiliary storage device in order to restore the previous operating state of the hibernation state of the graphic device; and a register restoring step of restoring the chipset hardware operating state such as RAMDAC data and the VGA register information after executing the memory restoring step.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A preferred embodiment of the present invention will become apparent from a study of the following detailed description with reference to the accompanying drawings.

Figure 1:
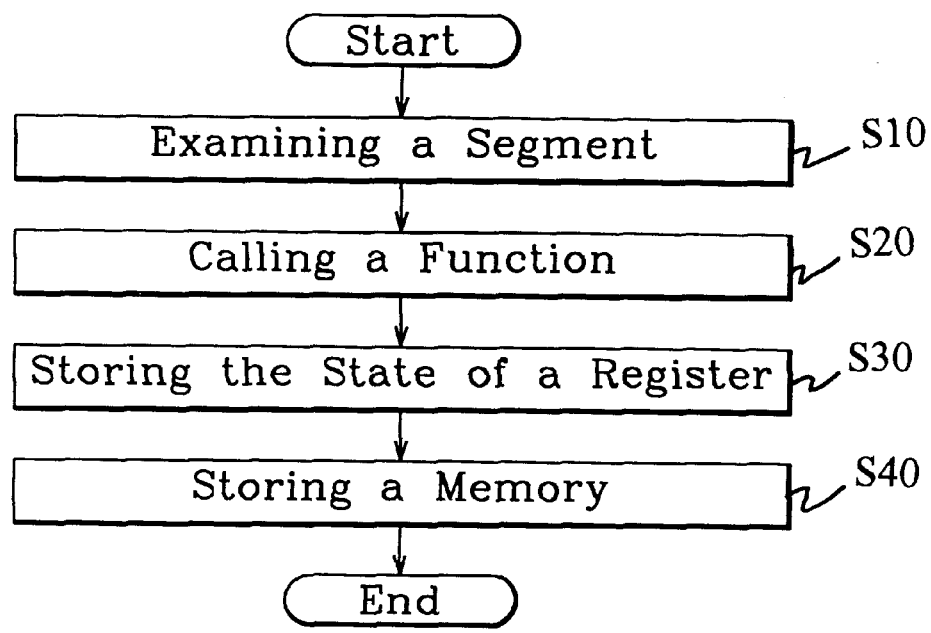
FIG. 1 is a flowchart of the method of storing data of a graphic device in accordance with the preferred embodiment of the present invention.

As shown in FIG. 1, the data storing method of the graphic device in accordance with the preferred embodiment of the present invention may include a segment examining step (S10) of examining the VGA BIOS in order to know where the ROM BIOS is mapped among the option ROM area of the system memory map when changing into the hibernation; a function calling step (S20) of calling the VESA function for storing the VGA internal register of the graphic device; a register storing step (S30) of storing the chipset hardware operating state such as RAMDAC data and the VGA register information; and a memory storing step (S40) of determining the VGA register so that the access of the CPU is possible by examining a graphic memory contained within the graphic device and storing the graphic memory data in an auxiliary storage device.

Figure 2:
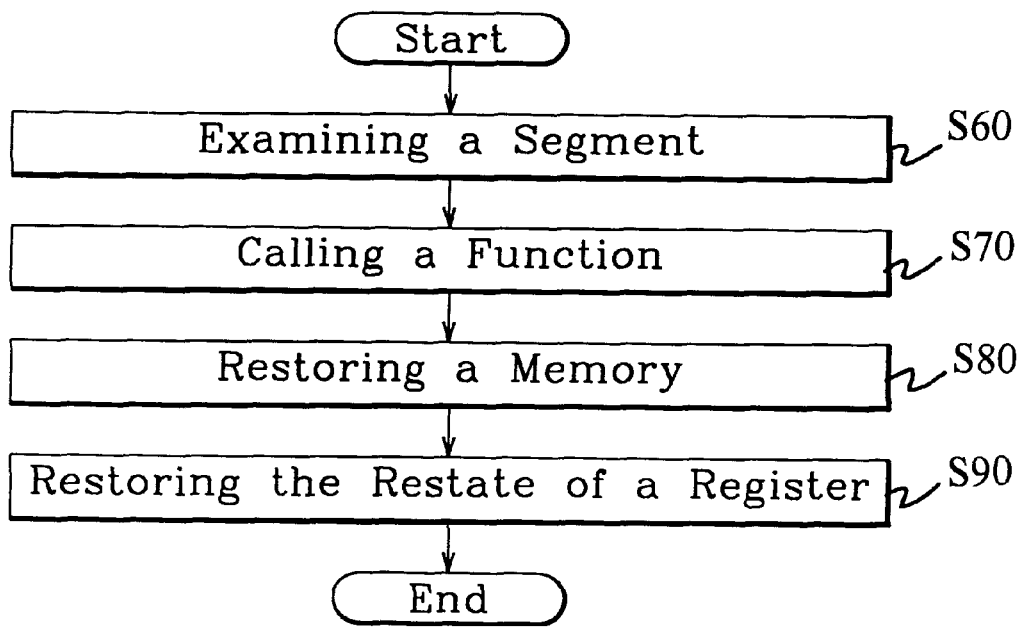
FIG. 2 is a flowchart of the method of restoring data of a graphic device in accordance with the preferred embodiment of the present invention.

As shown in FIG. 2, the data restoring method of the graphic device in accordance with the preferred embodiment of the present invention may be performed with a segment examining step (S60) of examining the VGA BIOS in order to know where the ROM BIOS is mapped among the option ROM area of the system memory map when changing from the hibernation state into the normal state; a function calling step (S70) of calling the VESA function for storing the VGA internal register of the graphic device; a memory restoring step (S80) of restoring the memory data of the graphic device from the data stored in the auxiliary storage device in order to restore the previous operating state of the hibernation state of the graphic device; and a register restoring step (S90) of restoring the chipset hardware operating state such as RAMDAC data and the VGA register information.

The operation of the data storing/restoring method of the graphic device in accordance with the preferred embodiment of the present invention is as follows.

Figure 3:
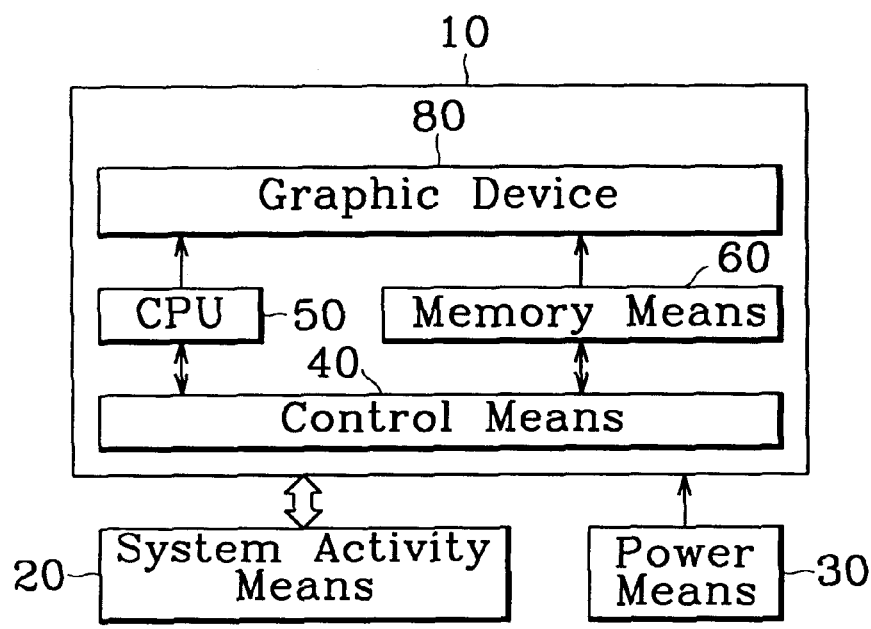
FIG. 3 is a block diagram of a personal computer.

FIG. 3 is a schematic diagram of a personal computer, and includes a system means 10, a system activity means 20, and a power means 30. The system means 10 includes a control means 40, a central processing unit 50, a memory means 60, and a graphic device 80. The memory means 60 includes a ROM and a RAM, and a ROM BIOS stored in the ROM executes the function for storing/restoring the graphic data. The system activity means 20 controls the system activity to a keyboard, a mouse, a floppy disk drive, a hard disk drive, and a compact disk ROM, and a remote control.

Figure 4:
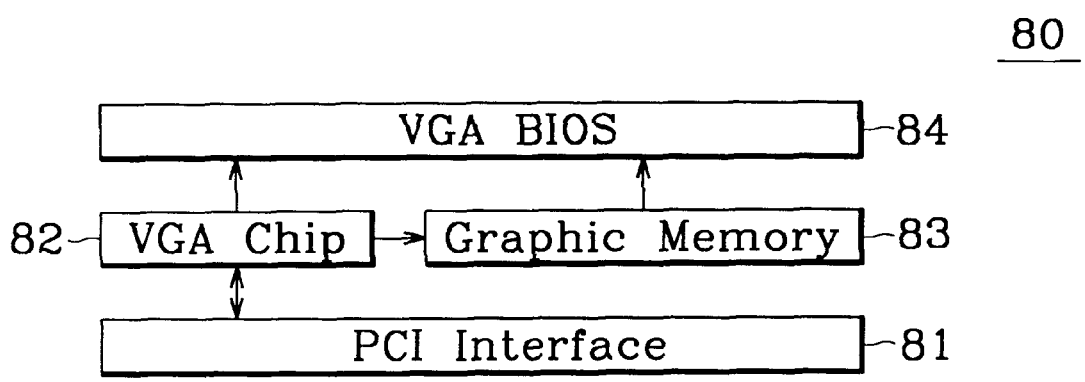
FIG. 4 is a block diagram of a graphic device of the personal computer.

FIG. 4 is a schematic diagram of a graphic device of the personal computer, and includes a VGA chip 82 having a core chipset of the graphic device 80, a graphic memory 83 for storing the graphic data, a VGA BIOS 84 having a control program of the graphic device, and a PCI (peripheral component interconnection) interface logic 81 for interfacing with the personal computer. The core of the core chipset is a magnetic core and stores the information of 1 bit as a storage element of the computer.

The method for changing a personal computer, as shown in FIG. 3, into a hibernation mode is as follows. If the user doesn't use the computer for a set period of time in a power saving mode, that is, when either a keyboard, a mouse, a hard disk drive, a floppy disk drive, and a CD-ROM (compact disk ROM) of the system is not used, the hibernation admission signal is generated by a hibernation admission button, a hibernation admission key of the remote control, a hibernation admission by a scheduler program, or a hibernation admission from the power means in an interruption of electric power. At this time, the system ROM BIOS executes the process for storing the VGA chipset state and the graphic memory data of the graphic device of FIG. 4. The ROM BIOS means a software routine including a low level routine for executing the simple input/output operation with an IBM compatible personal computer.

The present invention includes the method of storing the graphic data on a hibernation admission and the method of restoring the graphic data when returning to the normal state. With reference to FIG. 1, the method for storing data of the graphic device when executing the hibernation function is as follows. The segment examining step (S10) examines the VGA BIOS in order to know where the ROM BIOS is mapped among the option ROM area of the system memory map when changing into the hibernation state. That is, a determination is made as to where the ROM BIOS is mapped among the option ROM area of the system memory map since the memory segment of the ROM BIOS of the graphic device is located in either the C000h memory segment or the E000h memory segment.

After executing the segment examining step (S10), the VESA function calling step (S20) for storing the VGA internal register value of the graphic device is executed. When calling the VESA function, the value of the VGA internal register is returned to the input memory position indicated in the BIOS by the VGA BIOS VESA function (AX=4F01H, INT10H).

That is, the changed part according to the kind of graphic card is stored by using an extended VGA status read/write function of the VGA VESA function for storing the VGA chipset internal register, instead of executing the direct read/write by the input/output access of the method for storing IBM VGA compatible basic register and extend register in VGA, and is processed in the VESA extended VGA status read/write function of the VGA BIOS. More particularly, the graphic memory is repeatedly stored and restored after setting the linear address screen mode (800H600 resolution, 256 color mode) without clearing the graphic memory by using the VESA BIOS screen setting function supporting the same screen mode number and input/output for each graphic card, instead of using the screen setting method through the different linear address screen mode number according to the graphic chipset for storing the graphic memory.

Next, the register storing step S30 stores the chipset hardware operating state of the VGA register information and the RAMDAC data. The RAMDAC (RAM Digital Analog Converter) selects the color information comprised of 18 bits by using the 8 bits pixel data and converts the information to an analog signal. That is, the register storing step (S30) stores the hardware data (VGA chipset data) of the graphic device, and stores the VGA register information and the RAMDAC data and stores the value of the VGA extend register returned from the AX=4F04H, INT10H function of the VESA standard function to the hard disk drive.

The memory storing step S40 determines the VESA screen mode (AX=4F01H, INT10H) so that the CPU 50 may access by examining the graphic memory contained within the graphic device. At this time, the VGA memory mapping uses the packed pixel mode method instead of the plan guided method for increasing the storing speed and efficiency, and the memory data of the graphic device is stored in the hard disk drive.

The plan guided method is an analysis method for recognizing the image, increases the precision and processing efficiency, and includes the plan framing process for detecting the general existence scope of the subject and the process for analyzing and recognizing the detailed position and configuration of the subject according to the plan. The plan guided method is used for the 16 color mode, and divides the memory into four plans and the plans display red, green, and blue. The packed pixel mode method expresses one point as 1 byte (256 color mode) and 16 bits (64 K mode) (800H600, 256 color screen mode).

With reference to FIG. 2, the method of restoring data of the graphic device in accordance with the preferred embodiment of the present invention is as follows. When returning to the normal state from a hibernation state, the segment examining step (S60) examines the VGA BIOS in order to know where the ROM BIOS is mapped among the option ROM area of the system memory map. The function calling step (S70) calls the VESA function for storing the VGA internal register of the graphic device. Next, the memory restoring step (S80) restores the memory data of the graphic device from the data stored in the auxiliary storage device in order to restore the previous operating state of the hibernation of the graphic device.

The register restoring step (S90) restores the chipset hardware state of the graphic device such as the VGA register information and the RAMDAC data. The process for returning to the normal state executes the graphic memory restoring step (S80) for maintaining the register after storing, and then executes the register restoring step (S90) for restoring the graphic hardware state.

The present invention includes the method of storing the contents of the graphic device on a hibernation admission and restoration, and the method of restoring the data of the previous operating state of the graphic device stored in the auxiliary storage device when returning to the normal state in the graphic device having the hibernation function of the personal computer, examines the position of the memory map segment of the VGA BIOS of the graphic device when storing the data of the graphic device, uses the VESA function in order to store the data of the chipset hardware operating state of the graphic device, and then stores the graphic memory. The present invention restores the previous operating state of the graphic device when returning to the normal state, examines the position of the memory map segment of the VGA BIOS of the graphic device, restores the memory data of the graphic device from the data stored in the auxiliary storage device in order to restore the previous operating state of the graphic device, and restores the chipset hardware state VESA function of the graphic device.

The present invention provides a method of storing and restoring graphic data by expanding the kind of graphic card to be supported without changing the contents of the BIOS when supporting the hibernation function of a different graphic chipset.

What is claimed is:

1. A method of storing data of a graphic device, comprising:

a segment examining step of examining a video graphics array basic input/output system to determine where a read only memory basic input/output system is mapped in an option read only memory area of a system memory map when changing into a hibernation state;

a function calling step of calling a video electronics standards association function for storing a video graphics array internal register of the graphic device, the video electronics standards association function being a video electronics standards association basic input/output system screen setting function supporting a screen mode number and input/output for each graphic device;

a register storing step of storing a chipset hardware operating state, including random access memory digital to analog converter data and the video graphics array internal register information after calling said video electronics standards association function in the function calling step; and a memory storing step of determining the video graphics array internal register to allow access by a central processing unit by examining a graphic memory contained within the graphic device and storing graphic memory data of said graphic memory in an auxiliary storage device.

2. The method as claimed in claim 1, the step of storing in said auxiliary storage device of said memory storing step comprising storing in a hard disk drive.

3. The method as claimed in claim 1, the graphic memory of said memory storing step being mapped by a packed pixel mode method.

4. A method of restoring data of a graphic device, comprising:

a segment examining step of examining a video graphics array basic input/output system to determine where a read only memory basic input/output system is mapped in an option read only memory area of a system memory map when changing from a hibernation state into a normal state;

a function calling step of calling a video electronics standards association function for storing a video graphics array internal register of the graphic device, the video electronics standards association function being a video electronics standards association basic input/output system screen setting function supporting a screen mode number and input/output for each graphic device;

a memory restoring step of restoring memory data of said graphic device from the data contained in a graphic memory and previously stored in an auxiliary storage device in order to restore a previous operating state of the hibernation state of the graphic device; and a register restoring step of restoring a chipset hardware operating state, including random access memory digital to analog converter data and video graphics array register information.

5. The method as claimed in claim 4, the restoring from said auxiliary storage device of said memory restoring step comprises reading from a hard disk drive.

6. The method as claimed in claim 4, the graphic memory of said memory restoring step being mapped by a packed pixel mode method.

7. A computer having a graphic device, the computer comprising:

a cental processing unit connected to the graphic device;
a memory connected to the graphic device;
the central processing unit examining a video graphics array basic input/output system to determine where a read only memory basic input/output system is mapped in an option read only memory area of a system memory map when changing into a hibernation state;

the graphic device including a video graphics array internal register, the central processing unit calling a video electronics standards association function for storing the video graphics array internal register of the graphic device, the video electronics standards association function being a video electronics standards association basic input/output system screen setting function supporting a screen mode number and input/output for each graphic device;

the central processing unit storing in the memory a chipset hardware operating state, including random access memory digital to analog converter data and the video graphics array internal register information after calling said video electronics standards association function; and the graphic device including a graphic memory, the central processing unit accessing the video graphics array internal register by examining the graphic memory contained within the graphic device and storing graphic memory data of said graphic memory in the memory.

8. The computer as claimed in claim 7, the memory comprising a hard disk drive.

9. The computer as claimed in claim 7, the graphic memory including means for mapping by a packed pixel mode method.

10. A computer having of a graphic device, the computer comprising:

a central processing unit connected to the graphic device;
a memory connected to the graphic device;
the central processing unit examining a video graphics array basic input/output system to determine where a read only memory basic input/output system is mapped in an option read only memory area of a system memory map when changing from a hibernation state into a normal state;

the graphic device including a video graphics array internal register, the central processing unit calling a video electronics standards association function for storing the video graphics array internal register of the graphic device, the video electronics standards association function being a video electronics standards association basic input/output system screen setting function supporting a screen mode number and input/output for each graphic device;

the graphic device including a graphic memory, the central processing unit restoring memory data of said graphic device from the data contained in the graphic memory and previously stored in the memory in order to restore a previous operating state of the hibernation state of the graphic device; and the central processing unit restoring a chipset hardware operating state, including random access memory digital to analog converter data and video graphics array register information.

11. The computer as claimed in claim 10, the memory comprising a hard disk drive.

12. The computer as claimed in claim 10, the graphic memory including means for mapping by a packed pixel mode method.

* * * * *